United States Patent [19]

Isozumi

[11] Patent Number: 5,013,950

[45] Date of Patent: May 7, 1991

[54] COAXIAL STARTER WITH RECESSED PINION

[75] Inventor: Shuzou Isozumi, Himeji, Japan

[73] Assignee: Mitsubishi Denki K.K., Tokyo, Japan

[21] Appl. No.: 531,488

[22] Filed: May 31, 1990

[30] Foreign Application Priority Data

May 31, 1989 [JP] Japan .................................. 1-137966
May 31, 1989 [JP] Japan .................................. 1-137967
May 31, 1989 [JP] Japan .................................. 1-137968

[51] Int. Cl.⁵ ......................... H02K 5/15; F02N 15/06

[52] U.S. Cl. ......................................... 310/83; 74/7 A; 290/48; 310/78; 310/90

[58] Field of Search ............... 74/7 A, 7 C; 290/38 R, 290/48; 310/83, 90, 78

[56] References Cited

U.S. PATENT DOCUMENTS 4,684,816 8/1987 Mazzorana ............................ 290/48
4,760,274 7/1988 Isozumi ................................. 290/48
4,816,712 3/1989 Tanaka ................................ 310/237
4,929,858 5/1990 Konishi ................................. 310/78
4,962,340 10/1990 Isozumi ................................. 290/48

FOREIGN PATENT DOCUMENTS 1311876 11/1962 France .
52773 11/1982 Japan .

*Primary Examiner*—Steven L. Stephan
*Assistant Examiner*—D. L. Rebsch
*Attorney, Agent, or Firm*—Sughrue, Mion, Zinn, Macpeak & Seas

[57] ABSTRACT

A coaxial type starter comprises a motor having a tubular armature rotary shaft, an electromagnetic switch located at the rear part of the motor and having an operating shaft arranged in the same axial line as the armature shaft, an overrunning clutch for transmitting a rotating force only in one direction, and a pinion shaft which is disposed in the armature shaft to receive the rotating force thereof through the overrunning clutch. The front end portion of a clutch inner member in the overrunning clutch device is supported by a bearing which is fitted to a front bracket; the pinion shaft is so arranged that it is engaged with the inner circumference of the clutch inner member through a spline, and pinion teeth formed at the front end of the pinion shaft are radially overlapped by the bearing. The outer main body portion of the overrunning clutch is disposed in an inner circumferential portion of the front part of the armature core on which an armature coil is wound, and the rear portion of the clutch outer member is engaged with the armature shaft so as to be rotatable therewith.

2 Claims, 2 Drawing Sheets

COAXIAL STARTER WITH RECESSED PINION

BACKGROUND OF THE INVENTION

1. Field of the Invention

The present invention relates to a coaxial type starter device wherein the armature rotary shaft of a motor is arranged in the same axial line as that of an operating shaft in an electromagnetic switch.

2. Discussion of Background

There has been known a coaxial type starter as shown in, for instance, Japanese Unexamined Patent Publication No. 195331/1988. FIG. 2 shows such a coaxial type starter, which includes a dc motor 1 which comprises a yoke 2 which provides an outer circumferential wall, permanent magnets 3 attached to the inner circumference of the yoke 2 with intervals in the circumferential direction, an armature 4 rotatably disposed at the center of the yoke 2 and a face type commutator 5 connected to an end of the armature 4.

The armature 4 in the dc motor 1 comprises a tubular armature rotary shaft 6 and an armature core 7 attached to the outer circumference of the rotary shaft 6. A radially enlarged cavity portion is formed in the inner circumference of the tubular armature rotary shaft 6, and a plurality of cam surfaces are formed in the cavity portion in its circumferential direction. The face type commutator 5 fitted to the outer circumference of the armature rotary shaft 6 at its one end, namely, at the left side in FIG. 2, has a number of segments which are arranged in a plane perpendicular to the armature rotary shaft 6 so that they perform current rectification by their sliding contact with a plurality of brushes 8. Each of the segments is connected with an end portion of the armature coil 9 wound around the armature core 7.

The brushes 8 are supported by brush holders 10 made of a resinous material which are arranged outside a rear bracket *2a* which is formed integrally with the yoke 2 and which constitutes a part of an earth, or ground, circuit. The brushes 8 are forcibly pressed to the sliding surface of the commutator 5 by means of springs 11 through openings formed in the rear bracket *2a*.

A bearing 12 is fitted to the inner circumferential surface of a central opening formed in the rear bracket *2a*. The bearing 12 supports the rear end, i.e. the end facing the commutator, of the armature rotary shaft 6.

The brush holder 10 comprises a molded body in which a fixed contact 13 is insert-molded, the fixed contact 13 being connected to a terminal (not shown), and a terminal block 14 connected with a lead wire having a positive polarity which is connected to a brush 8 and a screw 15 which connects the terminal block 14 with the molded body.

The cam surfaces *6a* formed in the radially enlarged cavity portion of the armature rotary shaft 6 constitute a part of an overrunning clutch means. Namely, a clutch inner 16 in a tubular form is inserted in the cavity of the armature rotary shaft 6, and the front end portion of which is supported by a bearing 19 which is fitted to the front bracket 17. The front end portion of the armature rotary shaft 6 is supported by a bearing 18 which is fitted to the outer circumference of an intermediate portion of the clutch inner 16. The front bracket 17 is attached to the front end of the yoke 2, and it is fixed to the rear bracket *2a* by means of long bolts. A plurality of wedge-like spaces are defined by the outer circumferential surface of the clutch inner 16 and each of the cam surfaces *6a* formed at the circumferential surface of the radially enlarged cavity portion of the armature rotary shaft 6. In each of the wedge-like spaces, there are provided rollers 20 which connect the cam surface *6a* to the other circumferential surface of the clutch inner 16 and a spring (not shown) which presses the rollers 20 in the engaging direction. Thus, the overrunning clutch means is constituted by the cam surfaces *6a*, the clutch inner 16, the rollers 20 and the compression springs. Further, the armature rotary shaft 6 performs the function of the clutch outer.

A pinion shaft 21 as a rotary output shaft is disposed in the inner passage of the clutch inner 16 having a tubular shape. The clutch inner 16 is interlocked with the pinion shaft 21 by means of a helical spline formed in their outer and inner circumferences so that a rotating force can be transmitted between them, and they can be relatively moved in the axial direction. A reference numeral 16a designates the helical spline of the clutch inner 16 and 21a, the helical spline of the pinion shaft 21.

A pinion 21b is formed integrally with the front end of the pinion shaft so that the pinion 21b can be engaged with the ring gear (not shown) of an engine. The pinion shaft 21 is supported by a bearing 22 which is firmly fitted to the inner circumference of the rear part of the clutch inner 16. A spring 24 to return the pinion 21 is arranged between a stop ring 23 which is fitted to the outer circumference of the rear end of the pinion shaft 21 and the bearing 22.

A recess 25 is formed at the rear end surface of the pinion shaft 21. A first holder 26 having a cylindrical shape with one end opened is loosely fitted to the recess 25. A steel ball 27 is disposed between the bottom of the the recess 25 and the closed end portion of the first holder 26 to provide a thrusting force.

An electromagnetic switch device 28 is connected to the outer portion of the rear bracket *2a* by means of bolts 29. The electromagnetic switch device 28 comprises a casing 30, an exciting coil 32 wound around a plastic bobbin which is supported by front and rear cores 31a, 31b which form a magnetic circuit in association with the casing 30, a plunger 33 arranged in the central opening of the bobbin so as to be slidable and a moving assembly 34 attached to the plunger 33. The plunger 33 receives a pushing force by a coil spring 35 which is interposed between the plunger 33 and the front core 31a so as to return the plunger 33 to the original position as shown in FIG. 2 when a key switch is OFF.

The moving assembly 34 has a rod 36 as an operating shaft which has an end connected to the plunger 33 and the other end which opposes the first holder 26 disposed at the rear end of the pinion shaft 21.

A third holder 37 having an opening 37a which opens toward the side of the pinion shaft 21 is firmly attached to the outer circumference of the rod 36 at a position near the plunger 33. The third holder 37 supports at its outer circumference a movable contacter 38 having a movable contact 38c which is interposed between two insulating materials 38a, 38b, so as to be slidable along the outer circumference of the third holder 37. A second holder 39 is slidably fitted to the outer circumference of the other end of the rod 36 so as to be slidable in its axial direction. A spring 40 is interposed between the rear portion of the second holder 39 and the inner end surface of the opening 37a of the third holder 37 so that the pinion shaft 21 is pressed forwardly, i.e. on the right direction in FIG. 2. A spring 41 is interposed between the end surface of the other end of rod 36 and the inner end surface of the first holder 26 so that the pinion shaft 21 is pushed forwardly. Non-magnetic plate 42 closes the rear end of the casing 30, which functions as a stopper when the plunger 33 is returned backwardly and functions as the rear wall for the electromagnetic switch device 28.

A step portion having a reduced diameter 6*b* is formed at the outer circumference of the rear end portion of the armature rotary shaft 6. A cylindrical body 43 having an outer circumference which is subjected to a knuring operation for preventing the armature core 7 from turning is forcibly fitted to the outer circumference of the step portion 6*b*. The armature core 7 is forcibly fitted to the outer circumference of the cylindrical body 43, whereby the armature core 7 is integrally fixed to the armature rotary shaft 6. A hardening treatment is conducted to the armature rotary shaft 6 so as to have a strength necessary for supporting the structural elements.

The operation of the conventional coaxial type starter having the construction mentioned above will be described.

In a state of the key switch being OFF, the exciting coil 32 is not excited because no current is conducted. Since only the spring 35 acts on the plunger 33, the moving assembly 34 takes the backward position and the plunger 33 is in contact with the plate 42. At this moment, the fixed contact 13 is separated from the movable contact 38*c*, whereby the dc motor 1 is stopped. Also, the pinion shaft 21 is located at the rear position by the spring 24.

When the key switch is turned on, the exciting coil 32 is energized to move the plunger 33. Then, the moving assembly 34 is moved forwardly, and the movable contact 38*c* is brought to contact with the fixed contact 13. Accordingly, the current is supplied to the armature coil 9 through the brushes 8 and the commutator 5 to thereby start the dc motor 1.

On the other hand, the pinion shaft 21 is pushed forwardly by the springs 40, 41 of the moving assembly 34, and at the same time of starting the d.c. motor, the ring gear fixed to the outer circumference of the flywheel of the engine is interlocked with the pinion 21*a*. On the starting of the engine, the pinion shaft 21 and the clutch inner member 16 are reversely actuated through the ring gear, so that they are rotated at a speed faster than the revolution of the armature rotary shaft 6. Then, the engagement between the clutch inner member 16 and the armature rotary shaft 6 is released by the action of the overrunning clutch, so that the armature rotary shaft 6 becomes idling. When the key switch is turned off because the starting of the engine has been finished, the supply of the current is interrupted, and the moving assembly 34 is returned to the rear position along with the plunger 33 by the action of the spring 35 in the electromagnetic switch device 28. Accordingly, the pinion shaft 21 is also returned to the rear position by the action of the spring 24.

In the conventional coaxial type starter, however, there were the following problems.

(1) Since the armature rotary shaft 6 functioned as the clutch outer member of the overrunning clutch, there was no single assembly as the overrunning clutch. Accordingly, it was difficult to evaluate the function of the overrunning clutch because it was combined in the armature assembly 4. It was difficult to conduct quality control in manufacturing the overrunning clutch assembly.

(2) Efficiency in assembling the armature assembly was very poor because the armature rotary shaft 6 had a long and small axial bore. Since the armature coil projected in the axial direction of the armature 1, operations by fingers or jigs were difficult and it was also difficult to assemble thin rollers 20 to the armature rotary shaft 6.

(3) Since the overrunning clutch mechanism was arranged in the armature rotary shaft 6, there was a restriction that the outer diameter of the overrunning clutch mechanism could not be increased. Accordingly, a sufficient performance of the clutch could not be obtained. Namely, it could not be expected to greatly increase the effective length of the roller which increases the capacity because even when the length of the roller 20 was increased in its axial direction, there caused uneven contact to the cam surfaces 6*a*. Further, since there was a relation of the outer diameter of the clutch > the length L in the axial direction of the clutch with respect to the capacity of the clutch, the increase of the length L adversely affected to the increase of the capacity.

(4) Further, the coaxial type starter is apt to increase the entire length in comparison with a biaxial type starter wherein the operating shaft of the electromagnetic switch device and the armature rotary shaft are arranged in different axial lines in a parallel relation. Accordingly, there has been a strong demand to reduce the entire length in consideration of mounting a starter on the engine. Accordingly, the above-mentioned problems 1 through 3 had to be solved without increasing the entire length of the starter.

SUMMARY OF THE INVENTION

It is an object of the present invention to provide a coaxial type starter which is advantageous to quality control; provides good processability; and is capable of obtaining a sufficient capacity for the clutch and reducing the entire length.

The foregoing and other objects of the present invention have been attained by providing a coaxial type starter which comprises a motor having a tubular armature rotary shaft, an electromagnetic switch which is located at the rear part of the motor and which has an operating shaft arranged in the same axial line of the armature rotary shaft, an overrunning clutch device for transmitting a rotating force only in one direction, and a pinion shaft which is disposed in the armature rotary shaft to receive the rotating force of the armature rotary shaft through the overrunning clutch device, wherein the front end portion of a clutch inner member in the overrunning clutch device is supported by a bearing which is fitted to a front bracket, the pinion shaft is so arranged that it is engaged with the inner circumference of the clutch inner member through a spline means, and a pinion teeth portion formed at the front end of the pinion shaft is overlapped in its radial direction with the bearing, the clutch outer main body portion of the overrunning clutch device is disposed in the inner circumferential portion of the front part of the armature core on which an armature coil is wound, and the rear portion of the clutch outer member is engaged with the armature rotary shaft so as to be rotatable with the armature rotary shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
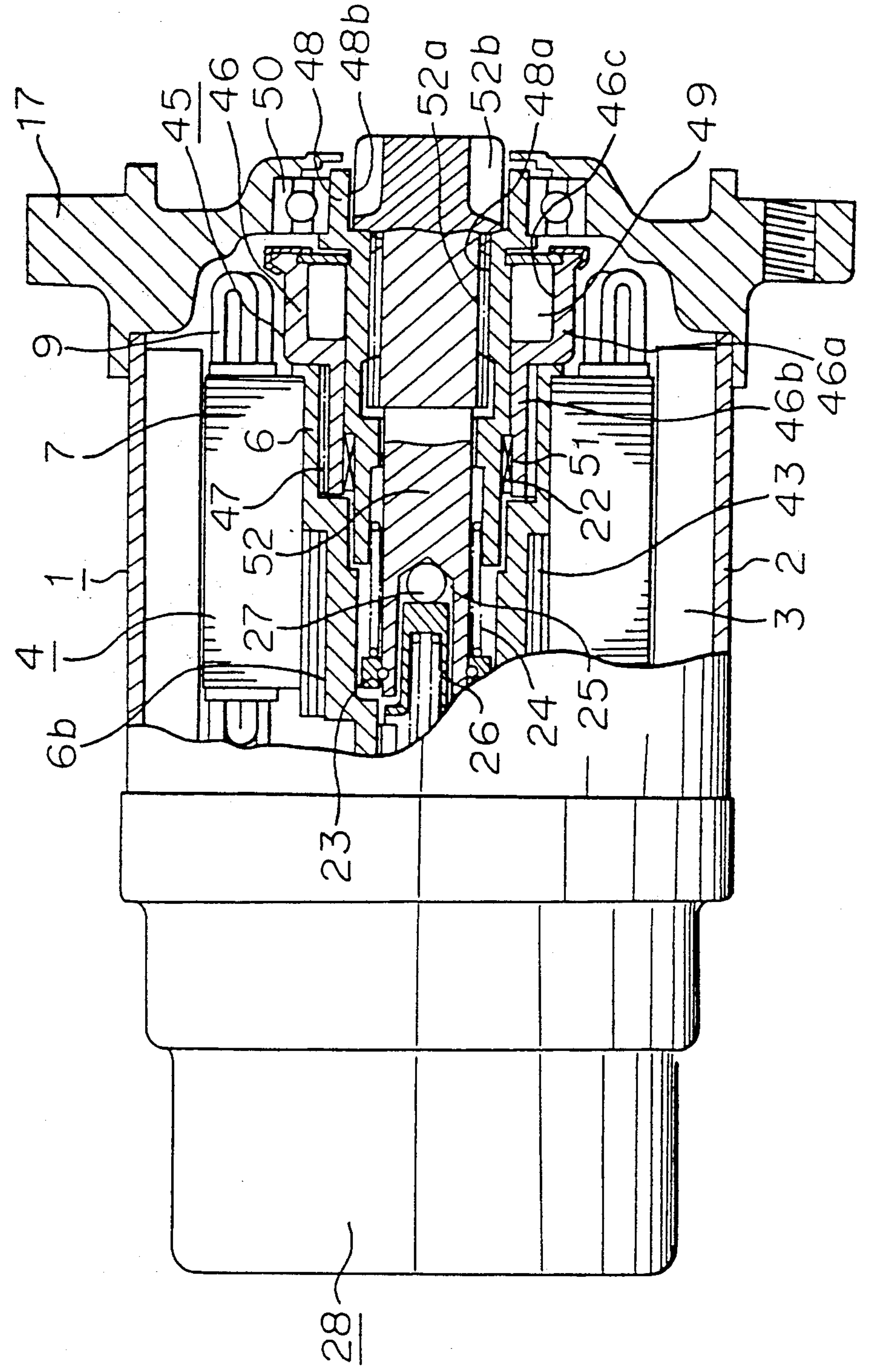
FIG. 1 is a longitudinal cross-sectional view partly omitted of an embodiment of the coaxial type starter according to the present invention.
Figure 2:
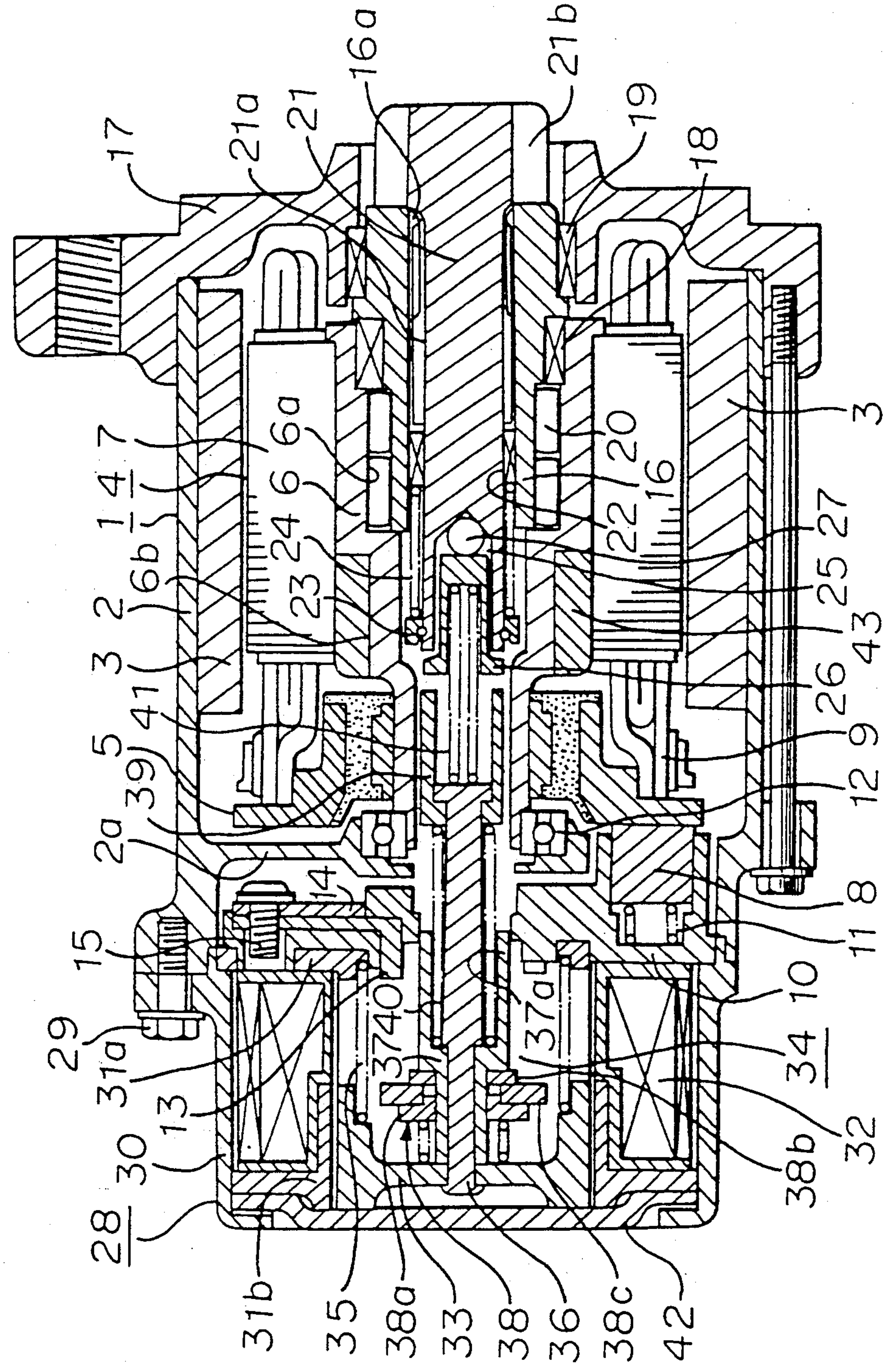
FIG. 2 is a longitudinal cross-sectional view of a conventional coaxial type starter.

A preferred embodiment of the coaxial type starter of the present invention will be described with reference to the drawing. In FIG. 1, numerals 1 through 44 designate the same structural elements as those in the conventional starter shown in FIG. 2, and accordingly, description of these parts is omitted.

A reference numeral 45 designates an overrunning clutch device including a clutch outer member 46. The main body portion 46*a* at the front end side of the clutch outer member 46 is positioned at the front side of the armature core 4 and at the inner circumferential side of the armature coil 9. The rear portion 46*b* of the clutch outer member 46 is engaged with the inner circumference of the armature rotary shaft 6 by means of a straight spline fitting portion 47. Thus, the overrunning clutch 45 constitutes a separate body from the armature rotary shaft 6. The main body portion 46*a* of the clutch outer 46 member has an outer diameter slightly greater than that of the armature rotary shaft 6, and a roller 49 is arranged between a cam surface 46*c* formed at the inner circumference of the clutch outer 46 member and a clutch inner 48 member. The front end portion of the clutch inner member 48 is supported by a bearing 50 fitted to front bracket 17. Another bearing 51 is interposed between the outer circumferential portion of the clutch inner member 48 and the rear portion 46*b* of the clutch outer member 46.

A helical spline 48*a* is formed at the inner circumference of the clutch inner member 48 so as to be engaged with a helical spline 52*a* formed in a pinion shaft 52 which is disposed within both the clutch inner member 48 and the armature rotary shaft 6. An enlarged diameter portion 48*b* is formed at the inner circumferential portion of the front end of the clutch inner 48. Pinion teeth 52*b* are formed at the front end portion of the pinion shaft 52 so that the pinion teeth 52*b* are inside the enlarged diameter portion 48*b* and at the position diametrically overlapping with the bearing 50. With such arrangement, the amount of projection of the pinion shaft 52 from the front bracket 17 is small. It is preferable that the number of pinion teeth 52*b* is seven or less.

Since the overrunning clutch device 45 is independent from the armature rotary shaft 6 in the coaxial type starter having the construction described above, the assembling operation of the overrunning clutch device 45 is easy. Further, in evaluating the function of the overrunning clutch device 45, it is unnecessary to take the armature assembly into consideration. Since the armature rotary shaft 6 is hardened by quenching the abrasion resistance of the spline fitting portion 47 can be enhanced, and the cylindrical body 43 makes the fixing of the armature rotary shaft 6 to the armature core 7 easy.

The overrunning clutch device 45 is arranged at the inner circumferential side of the armature coil 9 and in the front of the armature core 7, whereby the outer diameter of the clutch device 45 can be large, and accordingly, a sufficient capacity can be obtained for the clutch device.

Although the length in the axial direction of the starter is slightly longer than the conventional starter having the overrunning clutch which is disposed in the armature rotary shaft 6, the length in the axial direction of the pinion shaft 52 can be reduced in the present invention because the pinion teeth 52*b* are formed so that they are radially overlapped with the bearing 50. Accordingly, the increase of the length due to the overrunning clutch device 45 can be compensated by the pinion shaft 52 having a shorter length. In the present invention, the number of the pinion teeth 52*b* is determined to be seven or less, whereas in the conventional starter the number is more than 8. Accordingly, the pinion teeth 52*b* can be easily arranged inside of the clutch inner member 48, and such arrangement increases torque in the starter. Accordingly, the total length of the armature core 7 can be reduced when the same level of torque as the conventional starter is to be obtained, whereby the total length of the starter can be less than that of the conventional one.

In the above-mentioned embodiment, the armature rotary shaft 6 is engaged with the clutch outer member 46 by means of a spline structure. However, it is not limited thereto. In another method such as by using a key, forcible insertion may be used.

Thus, in accordance with the coaxial type starter of the present invention, a clutch outer is provided so as not to turn with respect to an armature rotary shaft; an overrunning clutch device is arranged at the front of an armature core and at the inner circumferential side of an armature coil; and pinion teeth are formed so as to be radially overlapped with a bearing which supports the front end of a clutch inner. Accordingly, it is advantageous to effect quality control; assembling can be easy; a sufficient capacity can be provided for the overrunning clutch device, and the total length of the clutch device can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A coaxial type starter which comprises:

a motor having a tubular armature rotary shaft, an armature core on which an armature coil is wound, said armature core having an inner circumferential portion, an electromagnetic switch which is located at a rear part of the motor and which has an operating shaft arranged in axial alignment with the armature rotary shaft, an overrunning clutch device having an inner member and an outer member for transmitting a rotating force only in one direction, and a pinion shaft which is disposed in the armature rotary shaft to receive the rotating force of the armature rotary shaft through the overrunning clutch device; wherein a front end portion of the clutch inner member in the overrunning clutch device is supported by a bearing which is fitted to a front bracket; the pinion shaft is so arranged that it is engaged with the inner circumference of the clutch inner member through a spline means, and a pinion teeth portion formed at a front end portion shaft is overlapped in its radial direction with the bearing; a clutch outer main body portion of the overrunning clutch device is disposed in the inner circumferential portion of a front part of the armature core; and a rear portion of the clutch outer member is disposed in and engaged with the armature rotary shaft so as to be rotatable with the armature rotary shaft.

2. The coaxial type starter according to claim 1, wherein the rear portion of the clutch outer member is connected to the armature rotary shaft by a spline means.

* * * * *